(No Model.) 2 Sheets—Sheet 1.
J. L. ISH.
MACHINE FOR CUTTING SAGE BRUSH.

No. 452,544. Patented May 19, 1891.

WITNESSES:
INVENTOR
ATTORNEY.

(No Model.) 2 Sheets—Sheet 2.
J. L. ISH.
MACHINE FOR CUTTING SAGE BRUSH.
No. 452,544. Patented May 19, 1891.
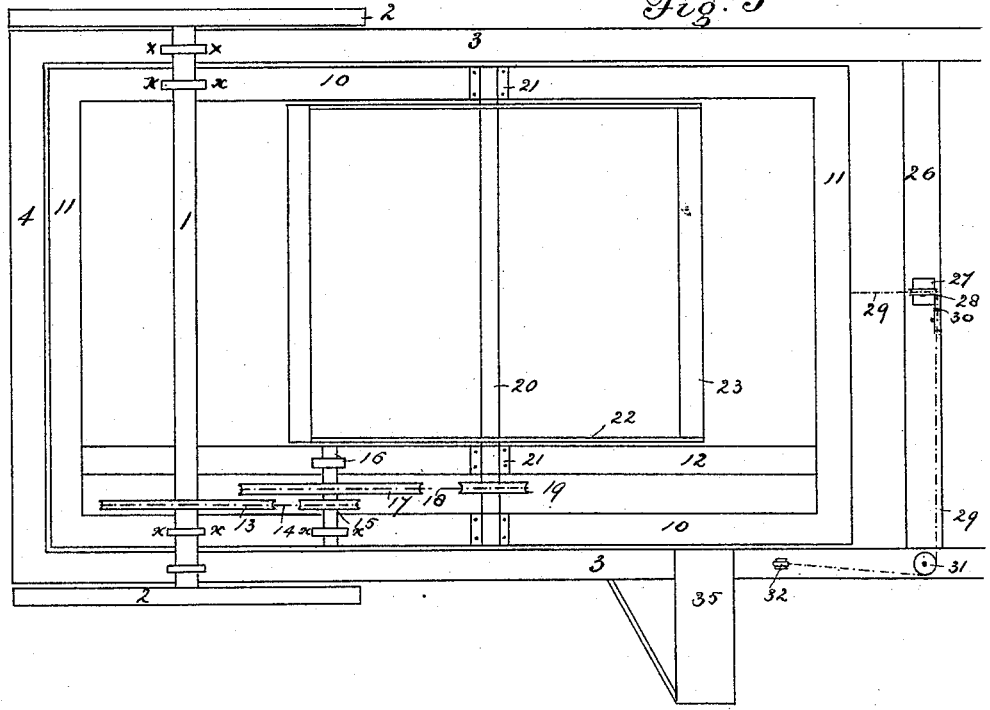
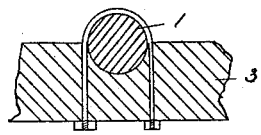
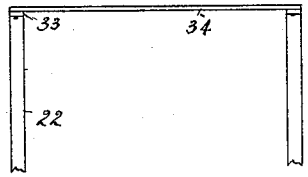
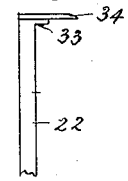
WITNESSES: INVENTOR
BY
ATTORNEY.

UNITED STATES PATENT OFFICE.

JOHN L. ISH, OF RAND, COLORADO, ASSIGNOR OF ONE-HALF TO PETER MONROE, OF SAME PLACE.

MACHINE FOR CUTTING SAGE-BRUSH.

SPECIFICATION forming part of Letters Patent No. 452,544, dated May 19, 1891.

Application filed July 26, 1890. Serial No. 360,113. (No model.)

*To all whom it may concern:*

Be it known that I, JOHN L. ISH, a citizen of the United States of America, residing at Rand, in the county of Larimer and State of Colorado, have invented certain new and useful Improvements in Machines for Cutting Sage-Brush; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new and improved form and construction of device for removing sage-brush and other coarse undergrowth from the land preparatory to breaking the same for cultivation.

To persons acquainted with some sections of our country, and particularly with sections of our western country, it is well known that chief among the obstacles to be overcome in preparing the land for cultivation is the removal of the sage-brush, which covers the land in a thick bunchy undergrowth. A device of this kind which will remove the sage-brush quickly, easily, and at a minimum of expense will render arable and place at the farmer's disposal large tracts of fertile and well-watered land which have hitherto been fit for nothing but pasture.

The object, therefore, of my invention is to produce a device of the class stated which shall be adapted to effect a cheap, speedy, reliable, and effective removal of the sage-brush, the device to be of simple construction, comparatively economical in cost, easily operated, and efficient for the purpose intended.

To these ends my invention consists of the features, arrangements, and combinations hereinafter described and claimed.

In the accompanying drawings is illustrated an embodiment of my invention, wherein—

Figure 1:
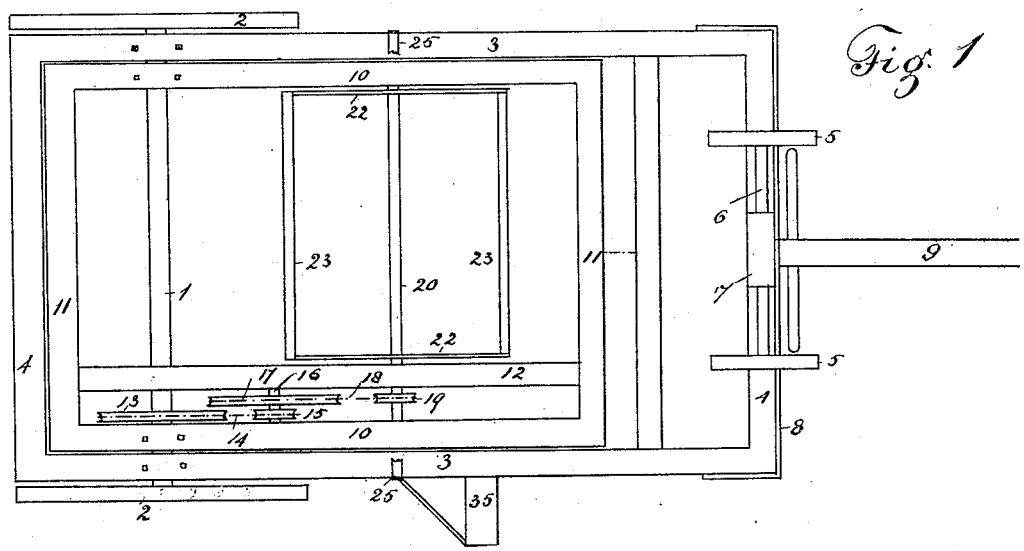
Figure 2:
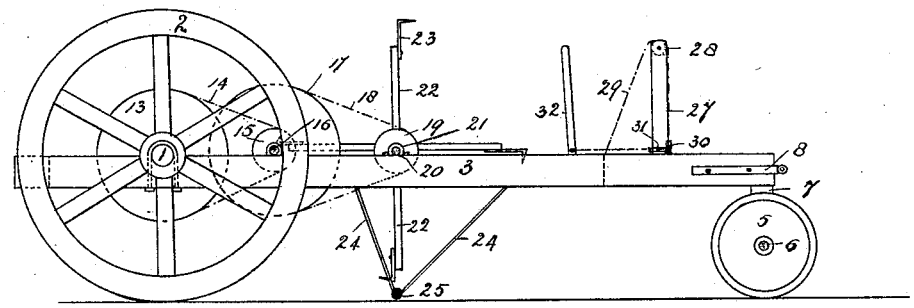

Figure 1 is an underneath view of my improved device, a portion of the stationary knife or bar being broken away; Fig. 2, a side elevation of the device, the seat being removed to better illustrate the mechanism; Fig. 3, a top or bird's-eye view of the device, the forward portion being broken away for lack of space; Fig. 4, a section on lines *x x*, Fig. 3, showing the construction of the bearings; Fig. 5, a side view of a modified form of knife, together with its supporting-arms; Fig. 6, an end view of the same.

Referring now to the views, the reference-numeral 1 designates the main axle mounted on main wheels 2, which are secured to and with which said axle is adapted to turn.

Pivotally secured to axle 1 are the side pieces or bars 3 of the main frame, the extremities thereof being united by cross pieces or bars 4, the forward end of said frame being supported by a suitable truck consisting of wheels 5, supporting axle 6, on which is mounted the blocking or bolster 7, which supports the main frame. The main frame is strengthened by a strap 8, binding its forward extremity, while secured to said strap 8 or to the main framing-piece 4 is a tongue 9 or other approved means of hitching a team thereto.

Journaled on axle 1 and within the main frame is a floating, tilting, or swinging frame composed of side pieces 10, within which axle 1 turns, and the end pieces 11. This frame is free to tilt on axle 1, the height of its forward extremity, and thus the height to which the brush is to be cut, being regulated by means hereinafter set forth. Rigidly secured within and extending longitudinally through said floating frame and near one side thereof is a bar 12, while fixedly secured to axle 1 between bar 12 and bar 10 nearest thereto is a chain-gear pulley 13, from which a chain 14 passing thereover transmits motion to a smaller chain-gear pulley 15, fixedly secured to a short shaft 16, suitably journaled in piece 12 and piece 10 nearest thereto.

Rigidly secured to shaft 16, and adapted to turn therewith, is a chain-pulley 17, somewhat larger than chain-pulley 15, while a chain 18, passing thereover, engages the periphery of a small chain-pulley 19, rigidly secured to shaft 20, journaled in boxes 21, which are secured to bar 12 and to side bars 10 of the floating or tilting frame. It will thus be seen that as the machine is moved forward the main wheels 2 rotate, causing axle 1 and chain-pulley 13 to revolve therewith, while through the medium of the gearing just described— namely, chain-gear pulleys 15, 17, and 19 and chains 14 and 18—a high speed or motion is communicated to shaft 20.

Rigidly secured to shaft 20 between bar 12 and the side piece 10 of the floating frame most remote therefrom are two or more sets of radial arms 22, the number of arms of the different sets being equal, while secured to the outer or free extremities of the corresponding arms are the knives or sickles 23. These knives are so deflected from the plane of the radial arms to which they are secured that as shaft 20, with the radial arms 22 and the knives 23, is revolved the edges thereof will be presented to the sage-brush or other material it may be desired to cut.

In the modified form of arms and knives shown in Figs. 5 and 6 it will be seen that instead of deflecting the knives, as shown in Fig. 2, the outer extremities of the arms 22 may be fashioned as at 33, to which a plane-knife 34 may be secured, thereby rendering the knives easier manufactured and much stronger and more durable in use.

Secured to the sides of the floating or tilting frame and extending downward therefrom are the bars 24, said bars supporting at their juncture a stationary bar, knife, or plate 25, against or past which knives 23 cut, the action of knives 23 against said bar or knife being somewhat similar to that of a pair of shears, bar 25 holding the material firmly and pressing it forward as knives 23 cut it off.

Extending across the main frame beyond the forward extremity of the tilting or floating frame is a cross-bar 26, on which is mounted a suitable standard 27, provided at its upper extremity with a vertical pulley 28, revolving in a plane parallel with the line of forward movement of the machine. Chain 29 is secured to the forward piece 11 of the tilting or floating frame, and extends thence up over pulley 28, down under a vertical pulley 30, pivoted on standard 27, and revolving in a plane at or approximately at right angles to the line of motion of the machine, thence around a horizontal pulley 31, pivoted to the main framing-piece, 3 and thence to a lever 32, pivoted to said piece 3. It will thus be seen that by the proper manipulation of lever 32 the height of the floating or tilting frame, and consequently the height at which the material is to be cut, may be nicely adjusted and also that the machine may be "thrown over" any stone, stick, or other obstacle that may chance to be in its course.

The reference-numeral 35 designates a suitable seat conveniently located, so as to give the operator a commanding view of his work and to place him within easy reach of the lever by the manipulation of which he controls the operation of the machine.

Having thus described my invention, what I claim is—

In a sage-brush-mowing machine, the main driving-wheels 2, a shaft 1, supported thereby and adapted to turn therewith, a tilting frame mounted on the axle 1, a main frame surrounding the tilting frame, means of supporting the forward extremity of the main frame, a shaft 20, journaled in the tilting frame and provided with radial arms 22, to the free extremities of which are secured knives 23, a bar 25, depending from the tilting frame and adapted to hold and push the material to be cut forward toward the revolving knives, a chain-gear wheel 13, secured to axle 1, a chain 14, connecting gear-wheels 13 and 15, gear-wheels 15 and 17, rigidly secured to shaft 16, chain 18, connecting chain-pulleys 17 and 19, chain-pulley 19 secured to shaft 20, a chain 29, secured to the forward extremity of the tilting frame, said chain passing over a pulley pivoted in the top of standard 27, thence under a pulley 30, pivoted at the base thereof, and thence around horizontal pulley 31 and to lever 32, in combination with suitable means of hitching a team thereto, substantially as described.

In testimony whereof I affix my signature in presence of two witnesses.

JOHN L. ISH.

Witnesses:
G. J. ROLLAUDET,
WM. MCCONNELL.